US008712870B2

(12) United States Patent
Baker

(10) Patent No.: US 8,712,870 B2
(45) Date of Patent: Apr. 29, 2014

(54) PRODUCTS FOR ANIMAL USE INCLUDING HUMANS HAVING A CERTIFICATE VERIFYING AT LEAST ONE OF EFFICACY OR SAFETY, AND METHODS OF PROVIDING SUCH CERTIFICATES

(76) Inventor: Christopher Baker, Los Angeles, CA (US)

( * ) Notice: Subject to any disclaimer, the term of this patent is extended or adjusted under 35 U.S.C. 154(b) by 633 days.

(21) Appl. No.: 12/961,492

(22) Filed: Dec. 6, 2010

(65) Prior Publication Data

US 2012/0143727 A1    Jun. 7, 2012

(51) Int. Cl.
*G06Q 30/00*    (2012.01)
(52) U.S. Cl.
USPC ........... 705/27.1; 705/1.1; 705/347; 705/500; 705/317; 707/999.103; 707/737; 235/385
(58) Field of Classification Search
USPC ............ 705/27.1, 1.1, 347, 500, 317; 426/61, 426/532, 541; 47/59 R
See application file for complete search history.

(56) References Cited

U.S. PATENT DOCUMENTS

| 7,043,442 | B2 | 5/2006 | Levy et al. | |
| 2005/0055860 | A1* | 3/2005 | Arrendale et al. | 40/637 |
| 2006/0286518 | A1* | 12/2006 | Yoder | 434/236 |
| 2008/0262768 | A1* | 10/2008 | Ramsden | 702/81 |
| 2009/0198541 | A1* | 8/2009 | Dolan et al. | 705/7 |
| 2011/0218885 | A1* | 9/2011 | Manski et al. | 705/27.1 |
| 2012/0203645 | A1* | 8/2012 | Sutter et al. | 705/19 |

OTHER PUBLICATIONS

<http://www.nsf.org/consumer/dietary_supplements/dietary_certification.asp?program=DietarySup>, p. 1 accessed Dec. 6, 2010.
Lynch, Determinants of Effectiveness for Environmental Determination and Labeling Programs, Report (Apr. 1, 1994). Retrieved from the Internet http://www.people.fas.harvard.edu/~hiscox/EPA_1994.pdf.
International Search Report and Written Opinion issued for PCT/US11/63617 dated Apr. 25, 2012.

* cited by examiner

*Primary Examiner* — Vanel Frenel
(74) *Attorney, Agent, or Firm* — Payam Moradian

(57) ABSTRACT

Provided are products for animal use including humans having a certificate verifying at least one of efficacy or safety and methods of providing such certificates.

21 Claims, 4 Drawing Sheets

PRODUCTS FOR ANIMAL USE INCLUDING HUMANS HAVING A CERTIFICATE VERIFYING AT LEAST ONE OF EFFICACY OR SAFETY, AND METHODS OF PROVIDING SUCH CERTIFICATES

BACKGROUND OF THE INVENTION

There are many products on the market for animal use, including humans. Consumers using these products have little information regarding the efficacy and safety of these products. Consumers rely on the manufacturer for efficacy and safety of the product. The manufacturers have a financial interest in their product and may market products without regard to efficacy and safety. There is a need in the prior art to protect a consumer in regard to products for animal use so that the consumer would know whether a product that includes the ingredients that it should, is efficacious and/or safe.

SUMMARY OF THE INVENTION

Provided in one embodiment is a product inside of a container or a package comprising at least one ingredient for animal use, wherein the product has a certificate on the container or the package that is visible to a user, said certificate being from a third party not having a financial interest in the product other than for certifying the product, or from a retail chain store that may have a financial interest in the product, wherein the certificate certifies at least one of efficacy or safety of the product, wherein safety is based on a determination of adverse physical or mental effect of the product. The ingredient may not have been subject to regulatory approval for efficacy or safety. The certificate may only certify efficacy. The container or package can contain a nutraceutical or a dietary supplement product and the certificate can certify one or more claims of efficacy on the package or container. The container or package can contain a pharmaceutical or homeopathic and the certificate certifies one or more claims of efficacy on the package or container. The animal can be a human.

Provided in one embodiment is a retail display comprising a plurality of products for animal use for sale to a consumer, wherein the product has a certificate visible to a consumer regarding efficacy from a third party not having a financial interest other than for certifying the product or from a retail chain store that may have a financial interest, said product being put in the same section on the retail display with other products having certificates for one or more of i) same or different efficacy; ii) safety. The retail display can be a virtual one on a website of a retailer that allows a consumer to view products based on certificates for efficacy.

Provided in one embodiment is a certificate on a container or package of a product, wherein the certificate is put on the container or package in such way to be visible to a consumer and the certificate is from a third party not having a financial interest in the product other than for certifying the product or from a retail chain store that may have a financial interest in the product, said certificate confirming at least one of efficacy or safety of the product, wherein safety is based on a determination of adverse physical or psychological effect of the product. The certificate can have a unique identification code that allows a consumer to obtain data on efficacy and safety of the product by inputting the identification code manually or by scanning it into a computing device. The certificate can have an expiration date. The certificate can certify one or both of efficacy and safety based on data after release of a product.

Provided in one embodiment is a method of confirming the efficacy and safety of a product comprising: a. having a product with at least one ingredient for animal use; b. a third party not having a financial interest other than for certifying the product or a retail chain store that may have a financial interest; c. the third party or the retail chain store analyzing existing data with or without generating new data to certify at least one of efficacy and safety, wherein safety is based on a determination of adverse physical or psychological effect of the product; d. if the safety or efficacy is: i. confirmed, the third party or the retail chain store applying a certificate to the product confirming the efficacy, safety, or both; ii. not confirmed, the third party or the retail chain store not applying the certificate.

Provided in one embodiment is a method of electronically determining whether a product for animal use has a certificate for efficacy or safety, comprising: a. a database comprising data on efficacy or safety of one or more products containing at least one ingredient for animal use, wherein the database is maintained by a third party not having a financial interest other than for certifying the product or from a retail chain store that may have a financial interest, wherein the third party or the retail chain store analyzes existing data with or without generating new data to certify the efficacy or safety of the product, wherein safety is based on a determination of adverse physical or psychological effect of the product; b. a communication network; c. a computing device that through the communication network allows a user to view and search the database. The computing device can be a personal or laptop computer, smart phone or a tablet computer. The order that a user views the database and any search results can be based on percent of efficacy. The order that a user views the database and any search results can be based on payments made from the manufacturer to the third party. The user can be a retail customer.

Provided in one embodiment is a computer readable storage medium having the database of claim embodied on said medium in a computer readable format.

DETAILED DESCRIPTION OF THE INVENTION

The present invention provides for a certification process where efficacy or safety of a product for animal use is verified by a third party lacking a. financial interest in the product other than for certifying the product or a retail chain store that may have a financial interest in the product. This certificate, such as that provided in FIG. 1, can be put on a container (FIGS. 2 and 4) or package (FIG. 3) comprising at least one ingredient inside of the container. The product can be a retail product or a raw ingredient from a bulk supplier. The certificate is preferably put on different products with the same and different ingredients and different efficacies.

The container or package hold (or contain) the product inside the container. The container is typically a bottle with a cap on top. The bottle can contain a liquid or solid product. The package is typically a box in which the container is put in, such as a cardboard box that a bottle is put in. The product can also be put in the package without a container. For example, the product, such as a raw ingredient, can be packaged directly in a plastic bag. Alternatively, pills are put in the box. The package can also be a blister pack where the product is put inside of the "blisters."

Figure 2:
FIG. 2 is an illustration of two containers in the shape of a bottle containing a supplement and vitamin C. Both bottles have a certificate on them that has a unique barcode and a product number associated with the certificate. The claim of efficacy that is being certified is on the vitamin C bottle.
Figure 3:
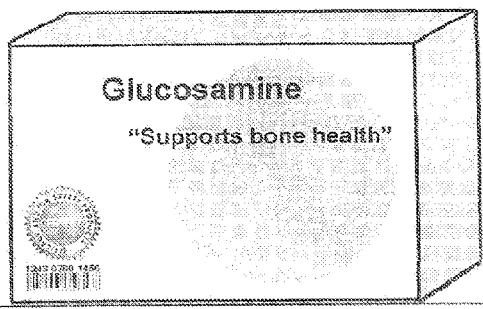
FIG. 3 is an illustration of a package containing a product (the product itself can be in a container such as a bottle) with a certificate that also has a unique bar code and a product number confirming at least one of efficacy or safety of the product.

Efficacy is generally defined as the power to bring about a therapeutic effect. The therapeutic effect can differ based on the nature of the product and the claim(s) of a manufacturer. For example, the efficacy that the certificate certifies can be a claim of medical/disease use for a pharmaceutical or homeopathic, or a structure/function claim for a nutraceutical or a dietary supplement (e.g. "supports bone growth"). The indication of use for a pharmaceutical is preferably those approved by a government regulatory agency, such as the FDA. The certificate can be independent of the efficacy claims made by the manufacturer; the certificate is issued for uses that the third party (or retail store) deems adequate, independent of whether the manufacturer does or does not make a claim for that use. In this embodiment, the certificate can list the uses for which efficacy has been confirmed. In another embodiment, the certificate certifies the efficacy for claims made by the manufacturer (FIG. 2). For example, with a nutraceutical or dietary supplement that is glucosamine, a manufacturer can make the claim "helps maintain proper joint function" and the certificate is put next to the claim or in a place visible to the consumer to certify the efficacy for supporting joint function. In another example, the product is vitamin D3 that makes the claim "supports bone health". In yet another example, the product can be toothpaste that makes the claim that it reduces cavities. A certificate can be put on the container or package of the toothpaste confirming the claim of cavity reduction. In a fourth example, the product could be chromium picolonate making the claim "helps maintain normal glucose levels".

The certificate can certify the efficacy or safety of a single ingredient, some or all ingredients in a formulation, or the entire formulation. The certificate can be dosage specific and certify the efficacy or safety for a particular dosage. In one embodiment, the certificate is put on a container or a package and certifies the efficacy and/or safety, preferably the efficacy of the formulation, including a particular dosage.

The third party, other than a retail chain store, lacks a financial interest in the product other than for certifying the product. The third party is not involved with the manufacture or distribution of the product. The third party could participate in design of the product based on what products it can certify. For example, a manufacturer would approach the third party and ask for a product to support bone health that the third party can certify. The third party can receive compensation for certifying a product and has a financial interest in the certification process, i.e., the third party gets paid for certifying a product. The third party's compensation can be a onetime fee with or without renewal fees.

The certificate can also be from a retail chain store that may have a financial interest in the product. A retail chain store has at least about 10 stores, such as more than about 100 stores, in a single country (US, Canada, UK, France, India, Germany, China). In this case, a typical pharmacy chain, supermarket chain or dietary supplement chain has a certificate that it applies to products to certify its efficacy or safety. The certificate can be applied to some or all products, including products that are sold under the name of the pharmacy chain, supermarket chain, or dietary supplement chain.

A product refers to one or more ingredients for administration to an animal, preferably a human, to support a function or a part of the body, or to treat or improve or prevent a health condition.

The product preferably has at least one therapeutic effect. Examples of products include pharmaceuticals (such as ibuprofen), nutraceuticals (such as glucosamine), dietary supplements (such as vitamins), cosmetics (such as wrinkle cream), cosmeceuticals (such as an anti-aging cream containing for example alpha hydroxy acids), homeopathics (such as nahonia aquilosfoium), herbal medicine (such as ginseng) and hygiene items (such as toothpaste), and functional food (such as vitamin enriched bread). The product can contain single ingredient or a combination of ingredients. The product can be a raw ingredient that is sold wholesale or a finished retail product. The product can be solely for human use, veterinary use, or a combination thereof. The product can have a single or multiple different efficacies. The product can be for internal or external use. The product can be for oral, buccal, sub-lingual, anal, dermal, or ocular administration.

Specific examples of products include: (Rx/OTC) Acetaminophen (Tylenol™), Acyclovir (Zovirax™), Alli (Orlistat™), Aricept™ (Donepezil Hydrochloride), Calcitonin-Salmon (Miacalcin™), Cardizem LA (Diltiazem™), Celebrex (Celecoxib™), Fluoride (Acidul™), Fluoxetine Hcl (Prozac™), Keflex™ (Cephalexin), Naproxen (Naprosyn™, Anaprox™ Anaprox DS™, Aleve™), Pantoprazole (Protonix™), Pantoprazole (Protonix™), Pravastatin Sodium (Pravachol™), Ranitidine Hcl (Zantac™), Selenium (Selsun™), Tadalafil (Cialis™), Testim™ (Testosterone Gel), Xanax XR™ (Alprazolam); (Dietary supplements & Homeopathic) Acidophilus Lactobacillus (Lactobacillus), Aloe Vera (Aloe), B Complex (Vitamin B12), Bioflavonoid Extract (Quercetin), Bioflavonoid Extract (Quercetin), Camellia Sinensis (Oolong Tea). Hypericum Perforatum (St. John's Wort), Mel (Melatonin), Milk Thistle, Milk Thistle, Pantothenic Acid (Vitamin B5 Sage of the Seers (Diviner's Sage), Sage of the Seers (Diviner's Sage), Sodium Fluoride (Fluoride), Stevia eupatoria (Stevia), Thymus substance (Thymus Extract), Turmeric root (Goldenseal), V (Vanadium), Vitamin A, Wine Extract (Resveratrol), Xin Ye Hua (Magnolia), Zafran (Saffron), Zinc Ascorbate (Zinc), Zyzyphus jujube (Jujube), Cold-Eeze™, Aconite, Arnica, Belladonna, Chamomile, Oscillococcinum™, Poison ivy.

Specific examples of efficacy in diseases for drugs and homeopathic include diagnosing, treating, curing and/or preventing any one or more of the following diseases: osteoarthritis, rheumatoid arthritis, inflammation, cancer, asthma, neurological disorders, psychiatric disorders, cardiovascular disorders, multiple sclerosis, osteoporosis, diabetes, gynecological disorders, Crohn's, Alzheimer's, Parkinson's, sexual disorders, GERD, AIDS, eye disorders, erectile dysfunction. Specific examples of efficacy for dietary supplements include support normal body function/structure function claims such as the following: helps maintain LDL cholesterol levels already in the normal range, helps maintain proper joint function, helps maintain blood sugar levels that are already in the normal range, helps alleviate minor aches and pains associated with daily life, helps maintain health and flexibility, helps alleviate the occasional blue feeling everyone experiences from time to time, provides optimal nutritional support during menopause, alleviates mood swings and hot flashes associated with menopause, alleviates the pain associated with exercise, alleviates occasional constipation, alleviates occasional gas, promotes sexual vigor and performance, helps maintain proper immune function, helps reduce stress and tension, and helps alleviate occasional constipation.

Some products or combinations of products and efficacies include:

| Product | Some Dietary Supplement Claims |
|---|---|
| Glucosamine/Chondroitin | Helps maintain proper joint function |
| | Helps support proper joint function |
| | Helps maintain flexibility |
| | Helps reduce stiffness and pain. |
| Chromium Picolonate | Helps maintain normal glucose levels |
| | Helps maintain normal HbA1c levels |
| | Helps maintain proper insulin function |
| | Helps maintain normal cholesterol levels |
| Conjugated linoleic acid (CLA) | Helps maintain healthy weight |
| | Helps promote healthy balance between muscle and fat |
| | Helps promote weight loss |
| | Helps promote a normal metabolism |

Figure 5:
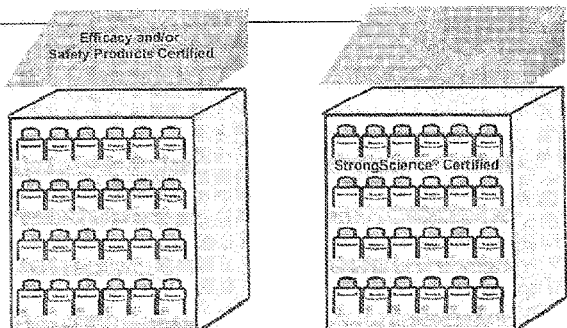
FIG. 5 is a retail display in a supermarket retail display that only contains products having a certificate confirming at least one of efficacy or safety of the product. The retail display can include products from different certification companies or only products from a single certification company.

The products having a certificate can be put together in a retail display in a section devoted solely to such products (e.g. FIG. 5). For example, a shopper who enters a supermarket or a dietary supplement store can go directly to section having products with certificates and be assured that the products purchased have a certificate for efficacy and safety. The products would have a certificate for different products. The display can also be virtual, such as a website of a retailer that allows a consumer to view products based on efficacy and safety.

Figure 1:
FIG. 1 is an illustration of a certificate confirming efficacy and/or safety of a product. The certificate can have a particular trademark (not shown) and can be limited to only one of safety or efficacy (not shown).
Figure 4:
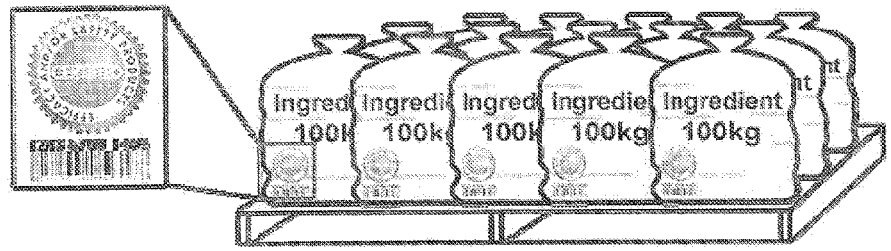
FIG. 4 is an illustration of containers holding bulk raw ingredients to be sold to manufacturers or other suppliers having a certificate confirming at least one of efficacy or safety.
Figure 8:
FIG. 8 is an illustration of a certificate confirming efficacy and/or safety of a product. The certificate has the trademark (StrongScience) of the certifying company (third party).

The certificate can be any symbol or mark that identifies the source of the certificate (e.g. FIG. 1). In one embodiment, the certificate has the name of "StrongScience" on it to certify a product (FIG. 8). It can be similar to those provided for kosher foods. The certificate is preferably put on the product in such way as to be visible to a consumer. The certificate can also have a unique identification code (FIGS. 2 and 4). For example it can have unique UPC number or a QR, allowing a user to input the number or scan the certificate to electronically view efficacy and/or safety of the product. The certificate can also have an expiration date. The expiration date can be put with the certificate or it can be used with the unique identification product. For example, a user who scans an expired certificate would get a message that the certificate has expired. If a payment is made by the manufacturer, then the certificate would be reactivated.

The certificate can come with assurances from the third party to the manufacturer. Such assurances can include for example assurance to defend the efficacy and safety of the product in court or before administrative agencies, and to indemnify part or all of the manufacturer's costs.

In another embodiment, the certificate is a post market surveillance certificate. In this embodiment, the certificate certifies that a product is safe and/or has the efficacy based on data after a product is launched. This certificate can for example be put on a product after the product has been marketed for two years. The third party can rely for example on any information of adverse effects to certify the product.

Also provided is a method of confirming the efficacy or safety of a product comprising: a. product with at least one ingredient for animal use; b. a third party not having a financial interest Other than for certifying the product or a retail chain store that may have a financial interest; c. the third party or the retail chain store analyzing existing data or generating new data to confirm at least one of efficacy or safety; d. if the efficacy and safety is: i. confirmed, the third party or the retail chain store applying a certificate to the product confirming at least one or both of efficacy and safety; ii. not confirmed, the third party or the retail chain store not applying the certificate.

In this method, a product is provided. The product is described above. A third party not having a financial interest in the product other than for certifying the product or a retail chain store that may have a financial interest analyzes existing data or generates new data to certify the efficacy of the product. First, existing data is analyzed to see if there is sufficient data to certify efficacy or safety. The existing data can be scientific publications, or non-published human and animal clinical and pre-clinical data. If the existing data is sufficient to support efficacy or safety, then the product would get a certificate for one or both of efficacy and safety. If the existing data is not sufficient, new data is generated, for example by carrying out clinical trials to certify the efficacy and safety.

Different parameters can be used to certify efficacy. The following tables illustrate some of the parameters that can be used for efficacy:

| Joint Pain | Diabetes | Obesity |
|---|---|---|
| Parameters: | Parameters: | Parameters: |
| Reduction in pain | Glucose normalization | Decrease in weight |
| Reduction in stiffness | Normalized HbA1c | Decrease in BMI |
| Increase in flexibility | Insulin normalization | Decrease in hip circumference |
| Increase well being | Normalized glucose tolerance | Decrease in waist circumference |
| | | Decrease in hunger |

Safety refers to a product having little or no adverse effect on a mental or physical condition of an animal including a human. A product can be safe even if it has some adverse effect when the adverse effect is minor in nature (e.g. nausea) and the efficacy outweighs the adverse effect. Safety involves more than an analysis for impurities and presence of the ingredients, and it is based on whether any single ingredient or the formulation as a whole is has little or no adverse effect even if the ingredient or the formulation is manufactured well (e.g., the formulation contains the ingredients that it should contain and lacks dangerous impurities). Examples of adverse effects include abnormal heart rate or blood pressure, rash, itching, headache, nausea, sexual dysfunction, nervousness, insomnia, agitation, sweating, abnormal body temperature, dry mouth, constipation, bladder problems, blurred vision, dizziness, drowsiness, amnesia, diarrhea, muscle aching and weakness, tingling or cramping in the legs or blood thinning.

Also provided is a method of electronically determining whether a product for animal use has a certificate for efficacy or safety, comprising: a. a database comprising data on efficacy and safety of one or more products containing at least one ingredient for animal use, wherein the database is maintained by a third party not having a financial interest other than for certifying the product or from a retail chain store that may have a financial interest, wherein the third party or the retail chain store analyzes existing data or generates new data to certify the efficacy or safety of the product; b. a communication network; c. a computing device that through the communication network allows a user to view and search the database.

The computing device can be a personal or laptop computer, smart phone (e.g., i-Phone) or a tablet computer (e.g., i-Pad). Other examples of computing devices are provided in US 2008/0104100, incorporated herein by reference. The computing device preferably has a user interface and a browser that allows a user to view and search a database that can be accessible though the internet. The communication network can be landline, wireless, or a combination thereof. For example, if a user is using a smart phone, part of the communication network is wireless to the tower, and the rest can be landline to the server hosting the database. Other examples of communication networks are provided in US 2008/0104100, incorporated herein by reference.

Figure 6:
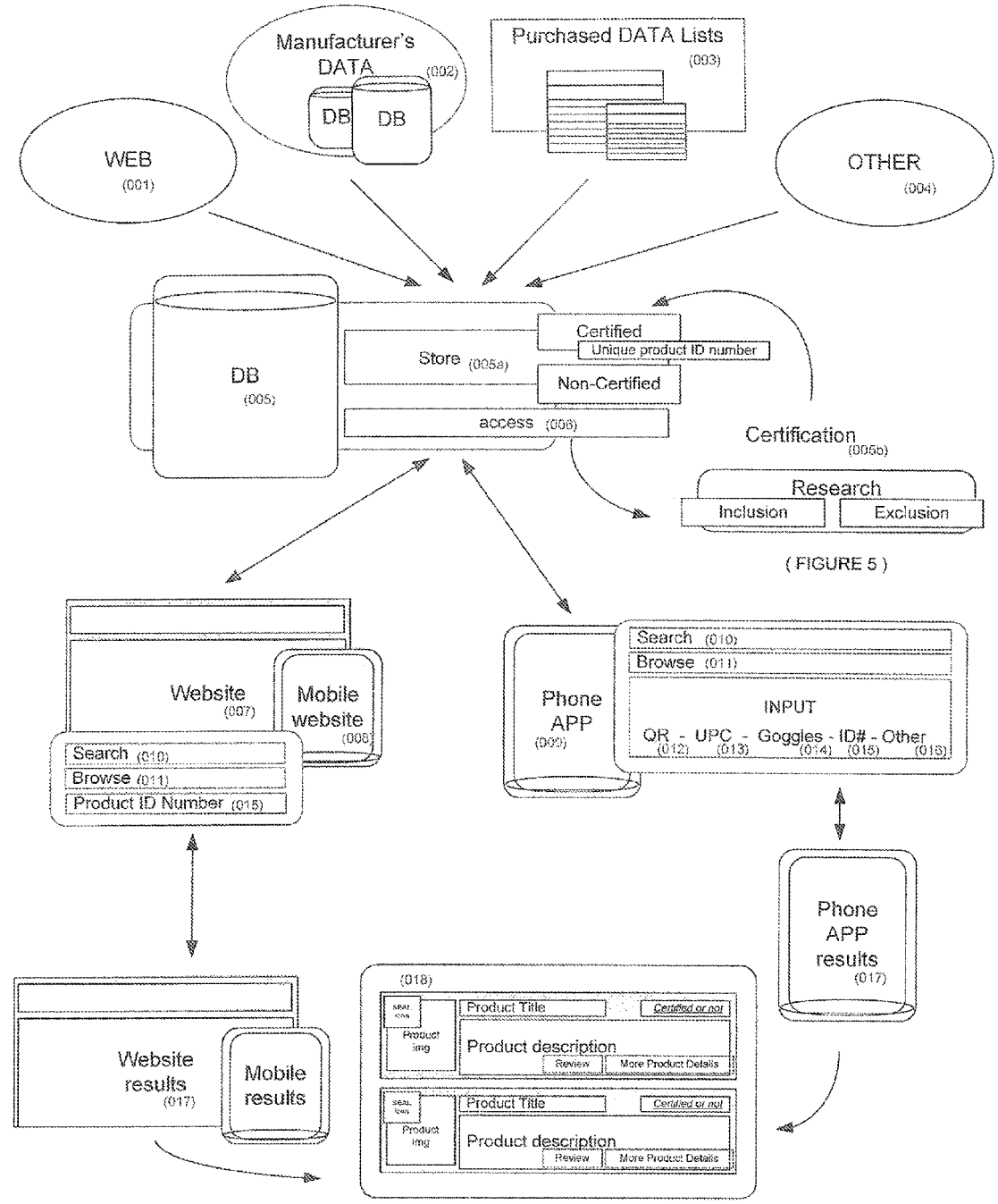
FIG. 6 is an example of how a database can be organized and accessed by a user.

FIG. 6 is an example of how a database can be organized and accessed by a user. Initial information to build the database, such manufacturer information, product data and other related research information can be compiled from trustworthy web sources (001), manufacturer's data networks (002), from purchased product lists (003), and, other sources like consultants—MDs, PhDs, other researchers. This compiled data is sorted and organized (004b) into certified and non-certified product. (005). Different options exist for the database. The database can only have products that are certified. Alternatively, it can also have a list of products that have not been certified. Research of products is conducted through the Certification (004a) process continuously as described below. Database can be queried (006) by a Mobile Phone Application (009) using the SCAN (009b) or other technique. SCAN will utilize the mobile phone camera to read QR (012), UPC (013), images to be interpreted by Goggles (014) and gather results (015) from the database. If Goggles is used, preferably only a portion of the software is used that scans and interprets a product so that a user is then directed to the website that allows viewing of the database. Results (015) are then presented to the user through a graphics display (016). Instead of a mobile application, a user can directly access the database by inputting the website's address. Database will be queried (006) by the Website (007) and Mobile website (008) using search (010) and browse (011) techniques. These techniques will gather results (015) from the database and present the results (015) to the user through a graphics display (016). The user can also search based on product name or even a product manufacturer. Both Certified and Non-Certified products can be shown. Certified products can have more details and the Certification Graphic/Seal (such as StrongScience certificate), while Non-Certified products can have limited information and no certification graphic. U.S. Pat. No. 6,523,021 and US Publ. No. 2008/0104100 are herein incorporated by reference in their entirety, particularly for teaching on building, searching and/or accessing databases.

Figure 7:
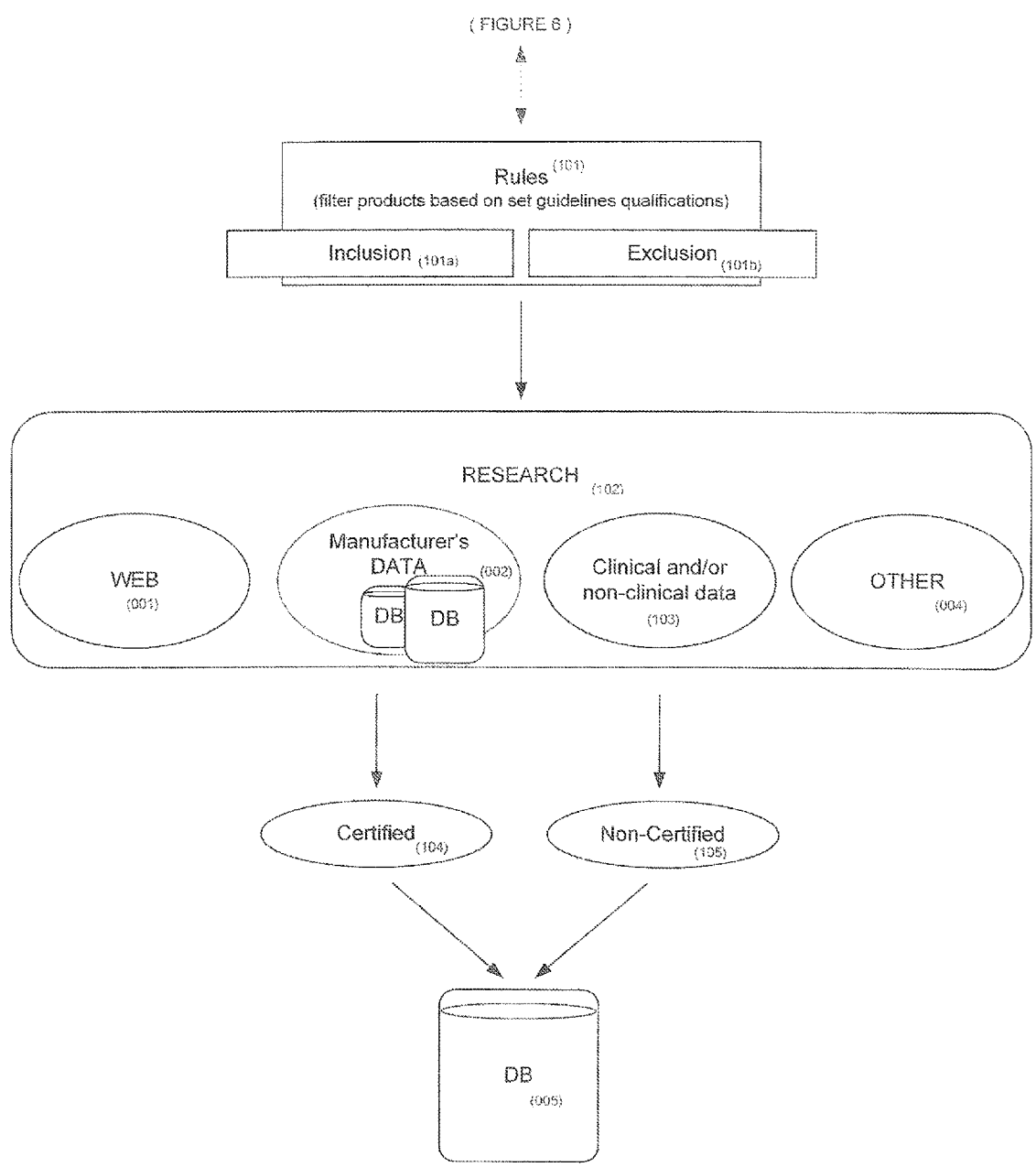
FIG. 7 illustrates the certification process where a first determination is made whether a product is certifiable at all best on inclusion and exclusion rules, and if it is certifiable, research is carried out to either certify the product or deny certification.

FIG. 7 illustrates the certification process where a first determination is made whether a product is certifiable at all best on inclusion (101a) and exclusion (101b) rules (101), and if it is certifiable, research (102) is carried out to either certify the product or deny certification. This figure is a continuation of the process provided in FIG. 6. First, a determination is met based on Rules (101) whether a product is certifiable (Inclusion (101a)) or not certifiable (Exclusion (101b)). For example, it may be evident on its face that a product may not have an efficacy and thus not be certifiable. Or, the third party or retail chain store may limit the products that it wants to certify based on a business decision. If a product is deemed certifiable (Inclusion), then research (102) is carried out. The research can rely on information from the web (001), manufacturer's data (002), clinical trials (003) and/or pre-clinical trials (004), and other sources like consultants such as MDs, PhDs, other researchers. Examples of this type of research whether or not to certify a product are provided in Examples 2-4. If the research shows the product has the efficacy and/or safety, then it is certified (104) and added to the database. Products that fail the certification (105) process can be excluded from the database (005) or added without a certification statement.

The user can search the database as needed. For example, the user can be a party interested in designing a product such as a dietary supplement to support bone growth. The user would search the database for ingredients certificated for supporting bone growth and design a product containing one or more ingredients with certificates for this use.

Another user can be a retail customer who has heard that a marketed product is good for a particular use. The user searches the database from a personal computer or a laptop to see if that product actually has a certificate. The user can also check to see if the ingredients in the product have a certificate. This user can also walk into a retail store and check for certificates of products though a smart phone or a tablet computer. The smart phone or tablet computer can have an application that launches the user directly to a website that allows access and searching to the data. If a user does not have the specific application, the user would open the browser and put in the address of the website that the user knows or is put on the product along with the certificate.

The user can browse or search the database. The homepage and the results of any search can be arranged in different ways, including based on efficacy of the ingredient for a particular use, alphabetical order, sales of an ingredient, payments from a manufacturer to a third party or to the retail chain.

For products that are certified, the database can provide reasons for its certification. For example, the next to each certification, the database can provide a cite or a link to one or more references that were used to certify the product for efficacy and/or safety.

The database can also be provided to a consumer without connection to the communication network, for example, on a computer readable storage medium having the database embodied on said medium in a computer readable format. The database can be downloaded on the hard drive or memory of the device. It can be put on a storage device such as a USB storage device, CD-ROM, flash memory, RAM, DVD, optical disk storage, or magnetic storage devices. The user can then view and search the database as needed. The use may be allowed to update the database by connecting to an updated database through the communication network.

U.S. Pat. No. 7,043,442 is also incorporated by reference here for its teaching of certification processes.

EXAMPLES

Example 1

Prophetic Example

A manufacturer of a product designs a dietary supplement that is a composition of three ingredients. The manufacturer has a contract manufacturer make the product. The product is put in a bottle. A structure/function efficacy claim is put on the bottle. The manufacturer asks a company that provides a certificate for the efficacy claim to certify the product. The certification company certifies the product because there is sufficient existing data showing that the composition of these three ingredients has the claimed efficacy. The certificate is put on the bottle and is visible to a consumer.

A consumer walks into a super market and goes to the dietary supplement section. The dietary supplements having a certificate for efficacy are in a separate section of the shelf. The consumer purchases the dietary supplement for the efficacy that the consumer seeks.

Example 2

Prophetic Example

A manufacturer of a product designs a nutraceutical product that is a composition of glucosamine and chondroitin as the two ingredients. The manufacturer has a contract manufacturer make the product in liquid form. The product is put in a bottle. A structure/function efficacy claim of "supports joint flexibility" is put on the bottle. The manufacturer also claims that the glucosamine is absorbed faster than preparations manufactured in capsule form. The manufacturer then asks a company that provides a certificate for the efficacy claim to certify the product. The company that provides a certificate initiates a search and review of data regarding research on the two ingredients. (The FTC standard of competent and reliable scientific evidence has been defined in FTC case law as "tests, analyses, research, studies, or other evidence based on the expertise of professionals in the relevant area, that has been conducted and evaluated in an objective manner by persons qualified to do so, using procedures generally accepted in the profession to yield accurate and reliable results." See, e.g. Vital Basics, Inc., C-4107 (Consent Apr. 26, 2004); see also In Re Schering Corp., 118 F.T.C. 1030, 1123 (1994).) <http://www.fda.gov/Food/GuidanceComplianceRegulatory-Information/GuidanceDocuments/DietarySupplements/ucm073200.htm>. The following information can be analyzed: in vitro and in vivo animal studies, human data, including testimonials, open label and controlled and/or blinded or randomized trials and any metanalysis of such data, with respect to the manufacturer product claims both in terms of efficacy and safety of the two product components.

The certificate granting company finds that based the body of evidence above that glucosamine and chondroitin combinations in solid forms have demonstrated "support for joint flexibility". However, two other issues remain to be resolved before certification: a. the liquid formulation does not have sufficient data for efficacy and safety b. the claim that glucosamine in the liquid formulation is absorbed faster than from solid does not have sufficient data to support it.

In order to certify the new product the liquid formulation is tested in a randomized placebo controlled blinded clinical trial and a comparative bioavailability trial designed to: a. demonstrate the efficacy and safety of the liquid preparation b. demonstrate that the absorption of the liquid preparation of glucosamine and chondroidin is better than that of a solid form. The first study includes the assessment of endpoints such as the Western. Ontario and McMaster Universities Osteoarthritis Index (WOMAC), SF-36v2 Quality of Life questionnaire, Visual Analogue Scale for Pain and stiffness Scale (VAS), Subjective Global Assessment Questionnaire, Analgesic usage while on the test product. Also measures of safety such as comprehensive metabolic panel (routine blood chemistries, including glucose, cholesterol, liver enzymes, Hematological (Complete blood count with differential), Coagulation Partial Thromboplastin Time (PTT), Blood pressure, heart rate and adverse event questionnaire are also assessed. The second study uses blood samples at various intervals after the ingestion of the liquid preparation in order to compare bioavailability parameters (such as Cmax—maximum concentration, Tmax—time at which maximum concentration occurs, AUC—area under the curve, etc) at the same intervals following the ingestion of a reference solid formulation.

Following the successful completion of the new studies with positive results, the data is organized and stored by the company that provides a certificate for easy viewing of interested parties and certifies the product. The certificate is put on the bottle and is visible to a consumer.

Example 3

Prophetic Example

A manufacturer of a product designs a nutraceutical product that is a composition of Chromium picolonate and caffeine as the two ingredients. The manufacturer has a contract manufacturer make the product in capsules. The product is put in a bottle. A structure/function efficacy claim of "helps maintain normal glucose levels" is put on the bottle. The manufacturer also claims that the chromium piconolate has greater absorption than preparations manufactured using chromium chloride. The manufacturer then asks a company that provides a certificate for the efficacy claim to certify the product. The company that provides a certificate initiates a search and review of data regarding research on the two ingredients. (The FTC standard of competent and reliable scientific evidence has been defined in FTC case law as "tests, analyses, research, studies, or other evidence based on the expertise of professionals in the relevant area, that has been conducted and evaluated in an objective manner by persons qualified to do so, using procedures generally accepted in the profession to yield accurate and reliable results." See, e.g. Vital Basics, Inc., C-4107 (Consent Apr. 26, 2004); see also In Re Schering Corp., 118 F.T.C. 1030, 1123 (1994).) <http://www.fda.eov/Food/GuidanceComplianceRegulatory-Information/GuidanceDocuments/DietarySupplements/ucm073200.htm>. The following information can be analyzed: in vitro and in vivo animal studies, human data, including testimonials, open label and controlled and/or blinded or randomized trials and any metanalysis of such data, with respect to the manufacturer product claims both in terms of efficacy and safety of the two product components.

The certificate granting company finds that based on the body of evidence above that chromium picolonate and caffeine combinations in solid forms have demonstrated "help in maintaining normal glucose level" and are safe at the proposed doses. However, one more issue remains to be resolved before certification: the claim that the chromium picolonate formulation is absorbed better than chromium chloride in the presence of caffeine does not have sufficient data to support it.

In order to certify the new product the present formulation is tested in a comparative bioavailability clinical trial to demonstrate that the absorption of the chromium picolonate in the preparation is higher than that of a preparation with chromium chloride. This study uses blood samples at various intervals after the ingestion of the chromium picolonate/caffeine preparation in order to compare bioavailability parameters (such as Cmax—maximum concentration, Tmax—time at which maximum concentration occurs, AUC—area under the curve, etc) at the same intervals following the ingestion of a reference chromium chloride/caffeine formulation.

Following the successful completion of the new study with positive results, the data is organized and stored by the company that provides a certificate for easy viewing of interested parties and certifies the product. The certificate is put on the bottle and is visible to a consumer.

Example 4

Prophetic Example

A manufacturer of a product designs a nutraceutical product that is a composition of conjugated linoleic acid, fish oil, vitamin D and caffeine as the four ingredients. The manufacturer has a contract manufacturer make the product in solid form. The product is put in a bottle. A structure/function efficacy claim of "helps promote weight loss" is put on the bottle. The manufacturer then asks a company that provides a certificate for the efficacy claim to certify the product. The company that provides a certificate initiates a search and review of data regarding research on the two ingredients. (The FTC standard of competent and reliable scientific evidence has been defined in FTC case law as "tests, analyses, research, studies, or other evidence based on the expertise of professionals in the relevant area, that has been conducted and evaluated in an objective manner by persons qualified to do so, using procedures generally accepted in the profession to yield accurate and reliable results." See, e.g. Vital Basics, Inc., C-4107 (Consent Apr. 26, 2004); see also In Re Schering Corp., 118 F.T.C. 1030, 1123 (1994).) <http://www.fda.gov/Food/GuidanceComplianceRegulatoryInformation/GuidanceDocuments/DietarySupplements/ucm073200.htm>.
The following information can be analyzed: in vitro and in vivo animal studies, human data, including testimonials, open label and controlled and/or blinded or randomized trials and any metanalysis of such data, with respect to the manufacturer product claims both in terms of efficacy and safety of the four product components.

The certificate granting company finds that based the body of evidence above that the individual components and some combination of these four have demonstrated "support for weight loss". However, the full composition of conjugated linoleic acid, fish oil, vitamin D and caffeine combination in solid form does not have sufficient data for efficacy and safety. In order to certify the new combination product the formulation is tested in a randomized placebo controlled blinded clinical. The study includes the assessment of endpoints such as weight, Body Mass Index (BMD, antropometric measurements (waist, hip, arm, thigh etc.) and Visual Analogue hunger and appetite Scales (VAS). Also measures of safety such as comprehensive metabolic panel (routine blood chemistries, including glucose, cholesterol, liver enzymes, Hematological (Complete blood count with differential), Coagulation Partial Thromboplastin Time (PTT), Blood pressure, heart rate and adverse event questionnaire are also assessed.

Following the successful completion of the new study with positive results, the data is organized and stored by the company that provides a certificate for easy viewing of interested parties and certifies the product. The certificate is put on the bottle and is visible to a consumer.

What is claimed is:

1. A product inside of a container or a package comprising at least one ingredient for animal use, wherein the product has a certificate on the container or the package that is visible to a user, said certificate being from a third party not having a financial interest in the product other than for certifying the product, or from a retail chain store that may have a financial interest in the product, wherein the certificate certifies at least one of efficacy or safety of the product, wherein safety is based on a determination of adverse physical or mental effect of the product.

2. The product of claim 1, wherein the ingredient has not been subject to regulatory approval for efficacy or safety.

3. The product of claim 1, wherein the certificate only certifies efficacy.

4. The product of claim 1, wherein the container or package contains a nutraceutical or a dietary supplement product and the certificate certifies one or more claims of efficacy on the package or container.

5. The product of claim 1, wherein the container or package contains a pharmaceutical or homeopathic and the certificate certifies one or more claims of efficacy on the package or container.

6. The product of claim 1, wherein the animal is a human.

7. A retail display comprising a plurality of products for animal use for sale to a consumer, wherein the product has a certificate visible to a consumer regarding efficacy from a third party not having a financial interest other than for certifying the product or from a retail chain store that may have a financial interest, said product being put in the same section on the retail display with other products having certificates for one or more of: i) same or different efficacy; ii) safety.

8. The retail display of claim 7, wherein the retail display is a virtual one on a website of a retailer that allows a consumer to view products based on certificates for efficacy.

9. A certificate on a container or package of a product, wherein the certificate is put on the container or package in such way to be visible to a consumer and the certificate is from a third party not having a financial interest in the product other than for certifying the product, or from a retail chain store that may have a financial interest in the product, said certificate confirming at least one of efficacy or safety of the product, wherein safety is based on a determination of adverse physical or psychological effect of the product.

10. The certificate of claim 9, wherein the certificate has a unique identification code that allows a consumer to obtain data on efficacy and safety of the product by inputting the identification code manually or by scanning it into a computing device.

11. The certificate of claim 9, wherein the certificate has an expiration date.

12. The certificate of claim 9, wherein the certificate certifies one or both of efficacy and safety based on data after release of a product.

13. A method of electronically determining whether a product for animal use has a certificate for efficacy or safety, comprising:
 a. a database comprising data on efficacy or safety of one or more products containing at least one ingredient for animal use, wherein the database is maintained by a third party not having a financial interest other than for certifying the product or from a retail chain store that may have a financial interest, wherein the third party or the retail chain store analyzes existing data with or without generating new data to certify the efficacy or safety of the product, wherein safety is based on a determination of adverse physical or psychological effect of the product;

b. a communication network;

c. a computing device that through the communication network allows a user to view and search the database.

14. The method of claim 13, wherein the computing device is a personal or laptop computer, smart phone or a tablet computer.

15. The method of claim 14, wherein the order that a user views the database and any search results is based on percent of efficacy of the product.

16. The method of claim 13, wherein the order that a user views the database and any search results is based on payments made from the manufacturer to the third party.

17. The method of claim 13, wherein the user is a retail, customer.

18. The method of claim 13, wherein the product is a dietary supplement or a nutraceutical or a device.

19. A computer readable storage medium having the database of claim 13 embodied on said medium in a computer readable format.

20. A container or a package comprising a nutraceutical or a dietary supplement product, wherein the container or the package has a certificate that is visible to a user, said certificate being from a third party not having a financial interest in the product other than for certifying the product, or from a retail chain store that may have a financial interest in the product, wherein the certificate certifies efficacy of the nutraceutical or the dietary supplement.

21. A certificate on a container or package containing a nutraceutical or a dietary supplement product, said certificate being from a third party not having a financial interest in the product other than for certifying the product, or from a retail chain store that may have a financial interest in the product, wherein the certificate certifies efficacy of the nutraceutical or the dietary supplement.

* * * * *